United States Patent
Gustafsson

(10) Patent No.: US 7,103,361 B2
(45) Date of Patent: Sep. 5, 2006

(54) METHOD AND SYSTEM FOR PLANNING AND/OR EVALUATION OF CELL CAPACITY IN (CDMA) RADIO NETWORKS

(75) Inventor: Nils Anders Stefan Gustafsson, The Hague (NL)

(73) Assignee: Koninklijke KPN N.V., Groningen (NL)

( * ) Notice: Subject to any disclaimer, the term of this patent is extended or adjusted under 35 U.S.C. 154(b) by 269 days.

(21) Appl. No.: 10/338,792

(22) Filed: Jan. 7, 2003

(65) Prior Publication Data

US 2003/0134641 A1 Jul. 17, 2003

Related U.S. Application Data

(60) Provisional application No. 60/352,695, filed on Jan. 29, 2002, provisional application No. 60/348,810, filed on Jan. 15, 2002.

(51) Int. Cl.
*H04Q 7/20* (2006.01)

(52) U.S. Cl. .................. 455/446; 455/436; 455/442; 455/439; 455/422.1; 455/450; 370/331; 370/329; 370/338

(58) Field of Classification Search ............... 455/446, 455/67.13, 561, 423, 422.1, 466, 436, 439, 455/442, 450; 370/328, 331, 338, 329
See application file for complete search history.

(56) References Cited

U.S. PATENT DOCUMENTS

| | | | | |
|---|---|---|---|---|
| 6,230,016 B1 * | 5/2001 | Benveniste | ................. | 455/450 |
| 6,347,226 B1 * | 2/2002 | Virtanen | .................... | 455/450 |
| 6,518,920 B1 * | 2/2003 | Proctor et al. | ............. | 342/367 |
| 6,529,739 B1 * | 3/2003 | Ljung | ......................... | 455/517 |
| 6,842,431 B1 * | 1/2005 | Clarkson et al. | ............ | 370/254 |
| 2002/0167933 A1 * | 11/2002 | Feli et al. | ................... | 370/349 |
| 2003/0076796 A1 * | 4/2003 | Kondo | ....................... | 370/332 |
| 2003/0109284 A1 * | 6/2003 | Akerberg et al. | .......... | 455/561 |
| 2003/0147353 A1 * | 8/2003 | Clarkson et al. | ........... | 370/252 |
| 2003/0148774 A1 * | 8/2003 | Naghian et al. | ............ | 455/456 |
| 2003/0169681 A1 * | 9/2003 | Li et al. | ..................... | 370/203 |
| 2004/0242257 A1 * | 12/2004 | Valkealahti et al. | ........ | 455/522 |
| 2005/0048978 A1 * | 3/2005 | Santhoff et al. | ............ | 455/442 |

* cited by examiner

*Primary Examiner*—George Eng
*Assistant Examiner*—Khai Nguyen
(74) *Attorney, Agent, or Firm*—Michaelson & Associates; Peter L. Michaelson; Alberta A. Vitale

(57) ABSTRACT

Method and system for planning and/or evaluation of cell capacity in (CDMA) radio networks comprising at least one base station that defines at least one cell. Both uplink cell capacity estimations and downlink cell capacity estimations can be made by adding amounts of traffic to the cell until a limiting capacity representative value has been reached.

42 Claims, 2 Drawing Sheets

METHOD AND SYSTEM FOR PLANNING AND/OR EVALUATION OF CELL CAPACITY IN (CDMA) RADIO NETWORKS

CLAIM TO PRIORITY

This application claims the benefit of U.S. provisional patent applications entitled "UMTS Capacity Planning", filed Jan. 15, 2002 and assigned Ser. No. 60/348,810; and "UMTS Capacity Planning (UL and DL)", filed Jan. 29, 2002 and assigned Ser. No. 60/352,695.

FIELD OF THE INVENTION

The invention relates to a method and a system for planning and/or evaluation of radio networks. More specifically, the invention relates to a method and system for planning and/or evaluation of cell capacity in (CDMA) radio networks comprising at least one base station that defines at least one cell.

BACKGROUND OF THE INVENTION

In recent years the concept of (wideband) code division multiple access (CDMA) has gained widespread international acceptance by operators active in the field of wireless communications. CDMA can significantly increase the capacity and the service quality and options of the networks when exploited by these operators.

One of the consequences of this development is the increase in interest in the planning and/or evaluation of radio networks in general and CDMA radio networks in particular. Radio planning and/or evaluation typically involves stages such as dimensioning, detailed capacity and coverage planning and/or network optimization. Radio planning is important for e.g. quick and accurate response to changes in e.g. traffic conditions or to cope with future traffic demands and as a consequence provides an operator with competitive advantages. Moreover accurate planning can contribute to higher cost efficiency in operating radio networks. The dimensioning stage in radio planning involves the estimation of the number and configuration of network elements, based, among others, on the operator's requirements and the radio propagation in the area. In the capacity and coverage planning stage base station locations, configurations and parameters are determined in more detail on the basis of e.g. real propagation data and estimated user density and traffic. In the network optimization stage the overall experienced network quality is assessed and improved if necessary. The method and system according to the invention can be used in all stages of the radio planning and/or evaluation, and is particularly useful in the capacity and coverage planning stage.

Problem Definition

The prior art fails to disclose a solution for planning and/or evaluation of radio networks based on adding traffic over all cells but in small steps, which is better to estimate the capacity of a whole cell.

The prior art is limited to uplink planning and/or evaluation. A solution for both uplink and downlink planning and/or evaluation is desirable for complete cell capacity estimations.

Aim of the Invention

The aim of the invention is to provide a solution for capacity planning and/or evaluation of whole cells of radio networks, where both uplink cell capacity estimations and downlink cell capacity estimations can be made.

SUMMARY OF THE INVENTION

The present invention provides a solution for capacity planning and/or evaluation of whole cells of radio networks, possibly CDMA radio networks, where both uplink cell capacity estimations and downlink cell capacity estimations can be made.

According to an aspect of the invention a method and system are provided for the planning and/or evaluation of a capacity in a radio network comprising at least one base station defining at least one cell. The method can comprise the following steps or a subset of the following steps, where the system comprises means to handle these steps:

Defining a limiting capacity representative value to the at least one base station in the at least one cell. When planning and/or evaluating an uplink capacity the limiting capacity representative value can be an unloaded link budget L, which can be defined as a function of a distance to the at least one base station in the at least one cell. The unloaded link budget L can be defined comprising a soft handover effect. When planning and/or evaluating a downlink capacity the limiting capacity representative value can be a maximum allowed transmission power $P_{BS,max}$.

Adding an amount of traffic to the at least one cell and calculating a used capacity representative value at the at least one base station for the added amount of traffic. It is possible that inter-cell interference is taken into account as well. A soft handover effect can also be taken into account. When planning and/or evaluating an uplink capacity the used capacity representative value can be a noise rise $\kappa$ comprising an intra-cell interference effect from the added amount of uplink traffic. When planning and/or evaluating a downlink capacity the used capacity representative value can be a required transmission power $P_{traffic}$.

Determining whether or not more traffic can be added by comparing the limiting capacity representative value to at least the used capacity representative value. When planning and/or evaluating an uplink capacity the unloaded link budget L can be compared to the noise rise $\kappa$. The criteria $\Sigma\kappa < L_{min}$, where $\Sigma\kappa$ is the sum of all noise rises $\kappa$ and $L_{min}$ is the minimum value of the unloaded link budget L can be used for this. Another criteria can be $\Sigma\kappa < L_{min} + x$, x is a non-zero value. When planning and/or evaluating a downlink capacity the maximum allowed transmission power $P_{BS,max}$ can be compared to the sum of a fixed power $P_{fixed}$ and the transmission power $P_{traffic}$. The criteria $P_{fixed} + \Sigma P_{traffic} < P_{BS,max}$, where $\Sigma P_{traffic}$ is the sum of all transmission power $P_{traffic}$, can be used for this. For downlink planning and/or evaluation the fixed power $P_{fixed}$ to the at least one base station in the at least one cell should be defined.

The adding of an amount of traffic and determining whether or not more traffic can be added can be repeated as long as more traffic can be added.

How much traffic is added can differ. The added amount of traffic can be a fixed amount of traffic. The amount of traffic can also be chosen such that the increase in used capacity representative value is fixed.

The system can comprise one or more modules. One or more modules can be provided to include an inter-cell interference effect in the calculation of the used capacity representative value. One or more modules can be provided to include a soft handover effect in the calculation of the used capacity representative value. One or more modules can be provided to define the unloaded link budget (L) comprising a soft handover effect. One or more modules can be provided to define the unloaded link budget (L) as a function of a distance to the at least one base station in the at least one cell. One or more modules can be provided to determine whether or not more uplink traffic can be added using the formula $\Sigma\kappa < L_{min}$, where $\Sigma\kappa$ is the sum of all noise rises $\kappa$ and $L_{min}$ is the minimum value of the unloaded link budget L. One or more modules can be provided to determine whether or not more uplink traffic can be added using the formula $\Sigma\kappa < L_{min} + x$, where x is a non-zero value. One or more modules can be provided to determine whether or not more downlink traffic can be added using the formula $P_{fixed} + \Sigma P_{traffic} < P_{BS,max}$, where $\Sigma P_{traffic}$ is the sum of all transmission power $P_{traffic}$.

A computer program can be used to perform steps as mentioned above for the method and can comprise modules as mentioned above for the system. The computer program can run on a computer system, at least including software code portions for performing one or more steps of the method as mentioned above when run on the computer system.

A radio network comprising at least one base station defining at least one cell can determine the uplink and/or downlink capacity using a method as mentioned above.

BRIEF DESCRIPTION OF THE DRAWINGS

The invention will be explained in greater detail by reference to exemplary embodiments shown in the drawings, in which.

DETAILED DESCRIPTION OF THE INVENTION

In a pending patent application EP01203391.6 a method and system for evaluating the uplink are presented. The method and system are particularly useful to find areas where coverage and system capacity are critical, but is less useful to estimate the capacity of a whole cell. The method and system use the noise rise as the main planning parameter. Alternative methods which are also based on the noise rise, but which work in a different way, can be used as well. Instead of increasing the traffic in a cell pixel-by-pixel, as done in the noise rise tables of the pending patent application, one could add the traffic all over the cell in small steps.

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

Figure 1:
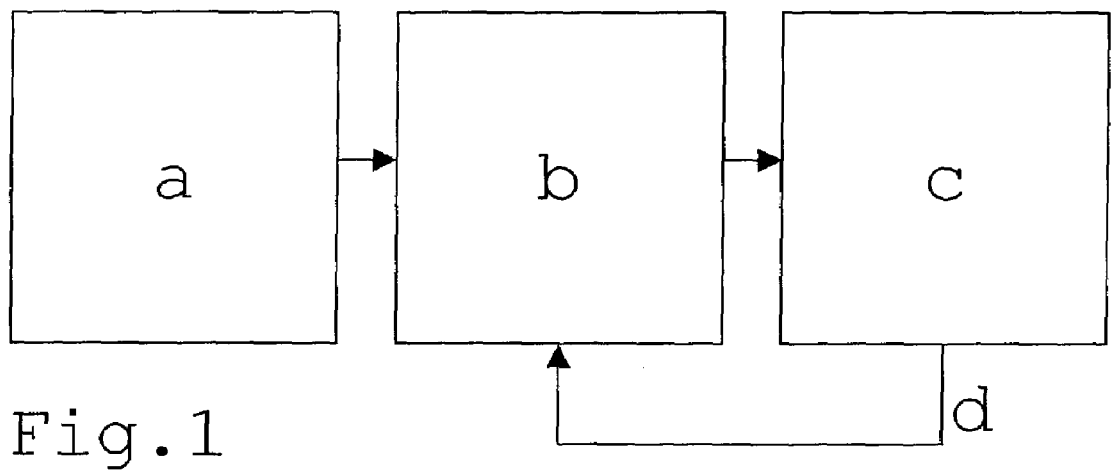
FIG. 1 shows the different steps of the capacity planning and/or evaluation process for a radio network according to an exemplary embodiment of the invention.

The planning and/or evaluation method according to an embodiment of the invention can involve the following phases as shown schematically in FIG. 1. Each phase can involve one or more steps programmed in corresponding modules or subroutines. At first the limiting capacity representative value is defined (a) for the cell that is to be planned and/or evaluated, which will be used to determine (c) whether or not more traffic can be added. The limiting capacity representative value can be a number or a function. Next an amount of traffic is added (b) to the cell. The best planning and/or evaluation results can be achieved when adding a small amount of traffic, but it is possible to use a larger amount of traffic. The traffic is added all over the cell in thin "slices", where the distribution in each slice corresponds to the assumed traffic distribution and the thickness of the slice corresponds to a fraction of the traffic distribution. From the added amount of traffic the used capacity representative value is calculated (b). This used capacity representative value can be compared to the limiting capacity representative value, from which it can be determined (c) whether or not more traffic can be added to the cell.

Figure 2:
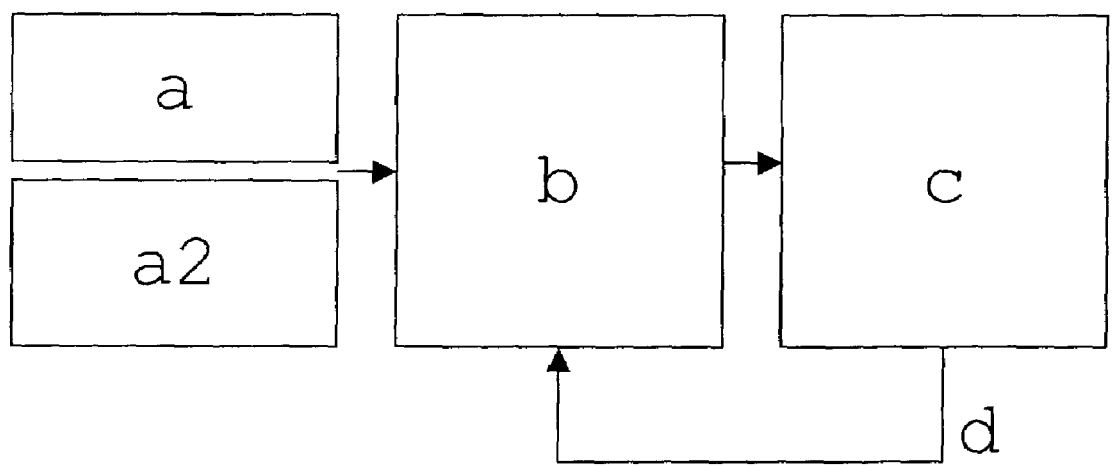
FIG. 2 shows the different steps of the downlink capacity planning and/or evaluation process for a radio network according to an alternative exemplary embodiment of the invention.

Alternatively the planning and/or evaluation method according to an embodiment of the invention can involve the additional step of defining a fixed power (Pfixed) to a base station in the cell. This is shown in FIG. 2 in block a2. The other blocks in FIG. 2 perform the same or similar functions to those shown in FIG. 1.

The steps of the method according to an embodiment of the invention will be discussed in more detail below for uplink cell capacity planning and/or evaluation and for downlink cell capacity planning and/or evaluation.

Uplink Cell Capacity Estimation

The link budget is a ratio, which expresses how much power a user requires for a connection (on average) with respect to the maximum transmission power. If the link budget is 0 dB, the user must transmit with maximum power, if it is 3 dB, it only requires half of the maximum power, and so on.

In this context the following notations are used:
loaded link budget: the link budget when taking the load (in the uplink the noise rise) into account;
unloaded link budget: the link budget when not taking the load into account;
link budget: as a general concept (can be either unloaded or loaded).

In the uplink, the difference between the unloaded and the loaded link budgets is thus the noise rise $\kappa$.

The relation says that the required MS transmission power for the mobile with the worst link budget is equal to the power it would need in an unloaded cell, namely $P_{MS,max} - L_{min}$, plus the noise rise $\kappa$ caused by all other traffic and possibly inter-cell interference. When $\kappa$ is equal to $L_{min}$, the MS with the weakest link budget needs to transmit with maximum power.

The uplink planning and/or evaluation method uses the unloaded link budget L as the limiting capacity representative value, and the noise rise $\kappa$ as the used capacity representative variable.

The uplink capacity is limited by the weakest unloaded link budget. When so much traffic has been added that the mobile station with the weakest link budget has to transmit with maximum power, the cell is considered as full.

In a CDMA system, the weakest link budget in a cell limits the number of users a cell can have before cell coverage problems begin to occur. This can be explained as follows. Suppose the cell is of limited area, for example because other cells surround it. Therefore some kind of cell border exists. Assume that for the moment other cells do not interfere with the cell of interest. $L_{min}$ denotes the weakest value of the unloaded link budget in the cell of interest. The weakest value of the loaded link budget is then $L_{min}-\kappa$, where $\kappa$ is the total noise rise caused by traffic.

Suppose that the maximum transmission power of a mobile station MS is $P_{MS,max}$. Then the required transmission power for a mobile station at the point of weakest link budget is: $P_{MS,req} = P_{MS,max} - L_{min} + \kappa$.

Figure 3:
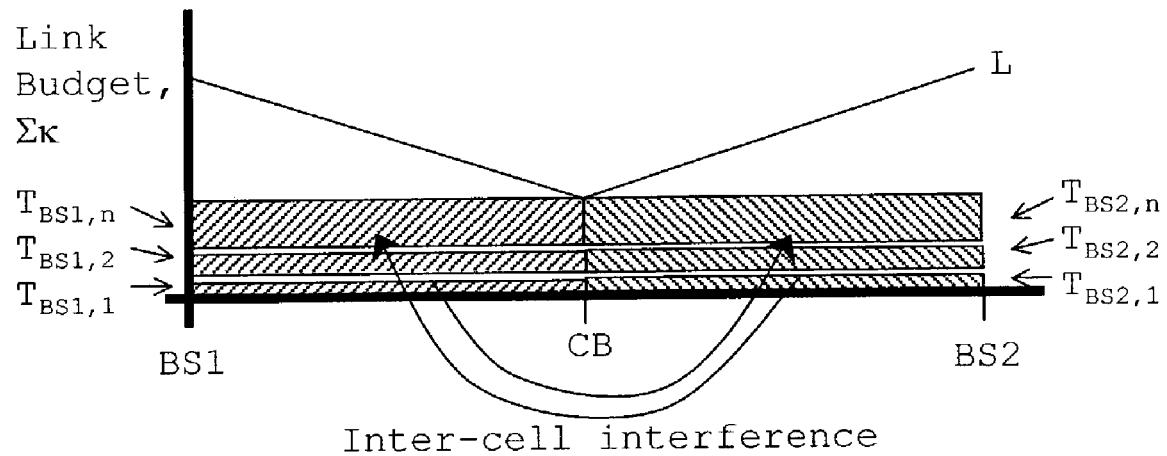
FIG. 3 shows the result for the uplink capacity for a radio network applying the method according to an exemplary embodiment of the invention.

This is also illustrated in FIG. 3, where the link budget L (in an ideal situation) decreases strictly monotonically with the distance from the base station. At some distance the cell border (CB) is encountered: if the MS goes any further, it connects to another cell instead (soft handover is not considered in this example). The weakest point in the unloaded link budget L is called $L_{min}$.

As the cell load increases, the link budget gets worse. Full coverage exists as long as the link budget is non-negative in the whole cell. Actually the traffic can be increased (c) (see FIG. 1) as long as the total noise rise $\kappa$ is less than $L_{min}$. This is the maximum capacity of the cell before cell-shrinking effects occur.

If more traffic were allowed in the cell (c) with in this case x having a value greater than 0, the noise rise would increase even more. This means that the user with the worst link budget no longer has sufficient transmission power to be received by the base station: the user is not covered in the uplink any longer. The extra traffic then causes the cell to shrink. This is the cell breathing effect.

To prevent cell breathing it is possible to define a maximum value for the total allowed noise rise $\kappa$, e.g. $\kappa_{max}=3$ dB or $\kappa_{max}=5$ dB. If this $\kappa_{max}$ is less than $L_{min}$ the method uses x having a value less than 0, i.e. $x=\kappa_{max}-L_{min}$. Besides preventing cell breathing the inter-cell interference can be limited in this manner.

Suppose that an unloaded link budget for in principle every pixel is calculated. In an ideal case the link budget L is only dependent on the propagation attenuation, i.e. it is a function of the distance from the base station as shown in FIG. 3.

At some distance, a user would rather have a connection with another cell instead. Assume that the link budget at this point defines the worst link budget in the cell. When moving on a line from the first base station (BS1) to the second base station (BS2), the link budget L would then increase again after this point (CB).

Having defined the link budget L, e.g. as a function of the distance for all pixels in each cell, traffic can be added. To take the inter-cell interference into account, it makes sense to add small amounts of traffic at a time, and for each increase of the traffic evaluate the effect of interference on other cells.

This is illustrated in FIG. 3, where a homogenous traffic distribution has been assumed. In cell 1 of base station 1 (BS1) and cell 2 of base station 2 (BS2) a thin "slice" ($T_{BS1,1}$ and $T_{BS2,1}$) of the assumed traffic distribution has been added. The thickness of the slice in FIG. 3 represents noise rise at the base station. At this stage, the noise rise takes the intra-cell interference into account. Other effects such as soft handover can be taken into account as well. In this example the cells are of the same size and the user density is the same, so the noise rise will be the same in both cells. Note that the difference between the unloaded link budget and the noise rise is equal to the loaded link budget.

For the next "slice" ($T_{BS1,2}$ and $T_{BS2,2}$) of traffic to be added in each cell, the inter-cell interference is taken into account. The total effect is expressed in an additional noise rise. That is, the total thickness of both slices represents intra-cell interference from all traffic added in the cell so far and interference from other cells. The first slice of traffic in cell 1 influences the noise rise for the first and second slices of traffic in cell 2, and vice versa. Note that inter-cell interference can be taken into account in different ways. For example, one may take the inter-cell interference caused by the traffic in the first cell into account already when adding traffic for the first time to the second cell.

The procedure of adding parts of the traffic is repeated (d) (see FIG. 1) as long as there is room for more traffic in the system. For the n-th slice in a cell, the interference of the n−1 slices in other cells is taken into account. At some point, the noise rise of the system will have reached the weakest point of the unloaded link budget. The traffic so far added to the cell corresponds to the maximum cell capacity for the given coverage area (i.e. for total coverage). This situation is shown in FIG. 3.

Note that in adding slices of traffic to a cell different approaches can be taken. In adding traffic one might aim at keeping the same increase of noise rise for each slice. The approach chosen here is adding the same amount of traffic for each slice, resulting in a noise rise that increases for each slice. This effect can be observed from the increasing thickness of subsequent slices ($T_{BS1,1}$, $T_{BS1,2}$, . . . , $T_{BS1,n}$) in FIG. 3.

So far soft handover gain has not been taken into account. Soft handover can be included by an improved link budget in the border region of two cells. This will effectively mean that more traffic can be added before the cell is full. Furthermore, because a user in soft handover generally uses less transmission power, his contribution to the noise rise should be less than for a user which is not in soft handover. This can be taken care of in the same way as described in patent application EP01203391.6

Different Ways of Employing the Uplink Planning and/or Evaluation Method

One may consider different strategies in employing this method for planning and/or evaluating a system. Without limitation to these strategies, below some examples are presented.

One can add traffic until at least one cell is full. This cell is then the limiting cell in the system. The smallest power headroom for mobile stations in other cells is then a kind of measure for the potential capacity in those cells.

Alternatively, one may continue to increase the traffic in cells, which are not yet full, and reduce the traffic in the cells where coverage problems occur. For example, suppose that cell A is full, but that there is room for more traffic in cell B. It could then happen that when more traffic is added in cell B, the noise rise in cell A caused by inter-cell interference rises above the maximum allowed one. Traffic can then be removed from cell A to give room for more traffic in cell B. In this way the total system capacity can be increased and one can obtain an estimate, which is closer to the total system capacity, though all of the traffic in one or several cells cannot be served.

A third way of proceeding is to evaluate cell-breathing effects. The weakest links in a limiting cell can be removed, thereby decreasing its coverage area. When traffic is added to the system users in the uncovered pixels are preferably not taken into account. Because the (previously) limiting cell has smaller coverage area, it can serve more users and the total system capacity can be increased. This procedure may be performed in an iterative manner.

When the maximum cell capacity has been found, it can be compared with the actual traffic offered. If the cell capacity is sufficient, no problems should occur and one can go on with other kind of evaluations, e.g. producing plots of coverage or required transmission power. If the capacity is insufficient, measures can be taken to increase the capacity. For example, sites, frequencies or sectors can be added. After a change of configuration the evaluation can be re-started.

Downlink Cell Capacity Estimation

The downlink planning and/or evaluation method uses the maximum allowed transmission power $P_{BS,max}$ of the base station as the limiting capacity representative value, and the required base station transmission power as the used capacity representative variable. In the downlink, the capacity is limited by the maximum base station transmission power. When all available power is required, the cell is full. The downlink situation is complicated by the fixed signal, which needs some of the available power of the base station and which causes interference. The adjustment of the fixed signal power is therefore part of the downlink planning. By using the proposed method in an iterative manner the fixed powers in the system can be optimized.

In some respects, the downlink is more complicated than the uplink. Especially, in the downlink one has to provide coverage of both the fixed signal and the traffic. The power assigned to the fixed signal is constant, whereas the power for the traffic signal for a particular user depends on many factors, e.g. bit rate, Eb/N0-requirement, and interference from other base stations at the position of the user. Furthermore, the total available power is limited. These are factors that complicate the downlink planning.

For the uplink planning and/or evaluation the noise rise was used as a main planning variable, because it took all important effects into account, such as inter-cell interference and cell load. For the downlink, the base station (BS) transmission power plays a similar role. It directly depends on inter-cell interference, target Eb/N0, the orthogonality factor, etc. Therefore the BS transmission power is chosen as a main planning variable for the downlink planning and/or evaluation.

The maximum allowed BS transmission power limits the capacity of the cell. As mentioned above, the transmission power is preferably divided between the fixed power and the power for the traffic channels.

One may calculate the total power required to serve all users in a cell. If this power, denoted by $P_{traffic}$, plus the fixed power $P_{fixed}$ is less than the total allowed transmission power $P_{BS,max}$, all users in the cell can be served. The allowed transmission power should be less than or equal to the available transmission power.

From this it will be understood that the fixed power assignment is important. The fixed power can e.g. be a pilot power. The pilot power must be high enough for the pilot to be detected in the entire cell area. It should also be detectable beyond the cell to make soft handover possible and so that the cell can be found in advance by a user moving towards the cell.

However, assigning too strong a power to the pilot will reduce capacity. On the one hand, the pilot needs a part of the limited BS transmission power. On the other hand the pilot also produces interference in the system. The evaluation of the pilot coverage and the assignment of the right pilot power therefore constitute an important part of the downlink planning.

One may estimate the downlink capacity in much the same way as the uplink capacity, by adding traffic in thin slices in each cell, thereby also taking inter-cell interference into account. The traffic is added according to the assumed traffic distribution until the maximum transmission power has been reached in at least one cell. The principle is illustrated in FIG. 4.

Figure 4:
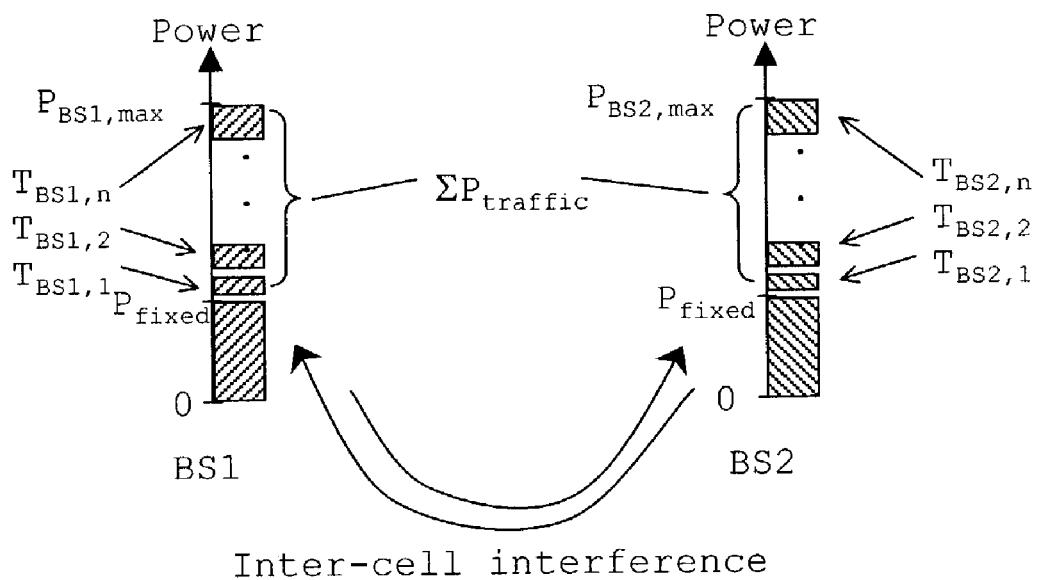
FIG. 4 shows the result for the downlink capacity for a radio network applying the method according to an exemplary embodiment of the invention.

Suppose two base stations, BS1 and BS2, each with a limited transmission power and each with a fixed pilot power ($P_{fixed}$), are present (see FIG. 4). This can be considered as the initialization of the system.

In the next step a thin slice ($T_{BS1,1}$) of traffic is entered into the system. The required transmission power for this amount of traffic is calculated, thereby taking the inter-cell interference caused by the pilot power of the other cell into account. The thickness of the slice in FIG. 4 represents the required transmission power at the base station.

Preferable for every further iteration another thin slice ($T_{BS1,2}, \ldots, T_{BS1,n}$) of traffic is added. Interference of traffic added so far in the own and other cells is taken into account. After some number of iterations the maximum base station transmission power will have been reached. The traffic so far added to the cell corresponds to the maximum cell capacity for the given coverage area.

The effects of soft handover, an improved link budget and therefore less required transmission power, can be taken care of by modifying the corresponding parameters in the equation for calculating the total traffic channel power $P_{traffic}$. For example, the path loss Lp may be reduced to model the link improvement, and the required Eb/N0 can be modified to model the reduction in required transmission power. Alternatively, an extra factor that directly takes all soft handover effects into account may be introduced in the equation.

Different Ways of Employing the Downlink Planning and/or Evaluation Method

Just like for the uplink planning and/or evaluation method one may consider several ways of employing the downlink planning and/or evaluation method, some of which will be indicated below.

For example, one might want to optimize the system by taking care of the cell which first limits the system capacity. The limiting cell is the one in which the maximum allowed transmission power is reached first.

Another way consists of removing some of the traffic in the limiting cell, and continuing to add traffic in other cells, until another cell is the limiting one, and so on. In this way one will obtain a capacity estimate which is closer to the total system capacity, though all of the traffic in one or several cells can not be served.

A third way of proceeding is to evaluate cell-breathing effects. The effect of reduced cell coverage can be evaluated by decreasing the coverage area and—at the same time—increasing the traffic above the maximum capacity for total coverage. This may be performed in an iterative manner.

When the maximum cell capacity has been found, it can be compared with the actual traffic offered. If the cell capacity is sufficient, no problems should occur and one can go on with other kind of evaluations, e.g. producing plots of pilot and traffic channel coverage, or of required transmission power. If the capacity is insufficient, there are several ways to proceed:

1) The pilot power is reduced in one or more cells to reduce cell coverage and free more transmission power for traffic channels;

2) Measures are taken to increase the capacity, e.g. sites, frequencies or sectors are added.

After a change of pilot power or configuration, the evaluation can be re-started.

The proposed method may also be used for optimizing the pilot power. This could be done in an iterative manner, where the power in each cell is adjusted downwards and/or upwards in small steps until the required coverage criteria are met.

The invention claimed is:

1. Method for the planning and/or evaluation of a capacity in a radio network comprising at least one base station (BS1,BS2) defining at least one cell, the method comprising the steps of
  (a) defining a limiting capacity representative value to the at least one base station (BS1,BS2) in the at least one cell;
  (b) adding an amount of traffic ($T_{BS}$) to the at least one cell and calculating a used capacity representative value at the at least one base station (BS1,BS2) for the added amount of traffic ($T_{BS}$);
  (c) determining whether or not more traffic ($T_{BS}$) can be added by comparing the limiting capacity representative value to at least the used capacity representative value; and
  (d) repeating adding an amount of traffic ($T_{BS}$) and determining whether or not more traffic ($T_{BS}$) can be added, as long as more traffic ($T_{BS}$) can be added;
wherein in which a fixed amount of traffic ($T_{BS}$) is added; wherein the amount of traffic ($T_{BS}$) is chosen such that the increase in used capacity representative value is fixed;
  wherein an inter-cell interference effect is included in the calculation of the used capacity representative value;
  wherein a soft handover effect is included in the calculation of the used capacity representative value;
  wherein the radio network is a CDMA network; and
  wherein:
    the capacity is a downlink capacity,
    the traffic ($T_{BS}$) is downlink traffic ($T_{BS}$),
    the limiting capacity representative value is a maximum allowed transmission power ($P_{BS,max}$),
    the used capacity representative value is a required transmission power $P_{traffic}$,
    determining whether or not more downlink traffic ($T_{BS}$) can be added by comparing the maximum allowed transmission power ($P_{BS,max}$) to the sum of a fixed power ($P_{fixed}$) and the transmission power $P_{traffic}$,
    the method further comprising the step of (a2) defining the fixed power ($P_{fixed}$) to the at least one base station (BS1,BS2) in the at least one cell.

2. Method according to claim 1 in which the determination whether or not more downlink traffic ($T_{BS}$) can be added uses the formula $$P_{fixed}+\Sigma P_{traffic}<P_{BS,max},$$

where $\Sigma P_{traffic}$ is the sum of all transmission power $P_{traffic}$.

3. A method for planning and/or evaluation of a capacity in a radio network comprising at least one base station (BS1, BS2) defining at least one cell, the method comprising the steps of:
  (a) defining a limiting capacity representative value to the at least one base station (BS1, BS2) in the at least one cell;
  (b) adding an amount of traffic ($T_{BS}$) to the at least one cell and calculating a used capacity representative value at the at least one base station (BS1, BS2) for the added amount of traffic ($T_{BS}$), in which the amount of traffic ($T_{bs}$) is added such that this corresponds to a fraction of the assumed traffic distribution; and
  (c) determining whether or not more traffic ($T_{BS}$) can be added by comparing the limiting capacity representative value to at least the used capacity representative value; and
  wherein:
    the capacity is an uplink capacity;
    the traffic ($T_{BS}$) is uplink traffic ($T_{BS}$);
    the limiting capacity representative value is an unloaded link budget (L); and
    the used capacity representative value is a noise rise κ comprising an intra-cell interference effect from the added amount of uplink traffic ($T_{BS}$).

4. The method recited in claim 3 further comprising the step of:
  (d) repeatedly adding an amount of traffic ($T_{BS}$) and determining whether or not more traffic ($T_{BS}$) can be added, as long as more traffic ($T_{BS}$) can be added.

5. The method recited in claim 3 wherein a fixed amount of traffic ($T_{BS}$) is added.

6. The method recited in claim 3 wherein the amount of traffic ($T_{BS}$) is chosen such that an increase in used capacity representative value is fixed.

7. The method recited in claim 3 wherein an inter-cell interference effect is included in the calculation of the used capacity representative value.

8. The method recited in claim 3 wherein a soft handover effect is included in the calculation of the used capacity representative value.

9. The method recited in claim 3 wherein the radio network is a CDMA network.

10. The method recited in claim 3 wherein the unloaded link budget (L) is defined as a function of a distance to the at least one base station (BS1, BS2) in the at least one cell.

11. The method recited in claim 3 wherein the unloaded link budget (L) is defined comprising a soft handover effect.

12. The method recited in claim 3 wherein the determination of whether or not more uplink traffic ($T_{BS}$) can be added uses the formula:

$$\Sigma\kappa<L_{min}$$

where: $\Sigma\kappa$ is a sum of all noise rises κ and $L_{min}$ is the minimum value of the unloaded link budget (L).

13. The method recited in claim 3 wherein the determination of whether or not more uplink traffic ($T_{BS}$) can be added uses the formula:

$$\Sigma\kappa<L_{min}+x$$

where: $\Sigma\kappa$ is a sum of all noise rises κ, $L_{min}$ is a minimum value of the unloaded link budget (L) and x is a non-zero value.

14. A method for planning and/or evaluation of a capacity in a radio network comprising at least one base station (BS1, BS2) defining at least one cell, the method comprising the steps of:
  (a) defining a limiting capacity representative value to the at least one base station (BS1, BS2) in the at least one cell;
  (b) adding an amount of traffic ($T_{BS}$) to the at least one cell and calculating a used capacity representative value at the at least one base station (BS1, BS2) for the added amount of traffic ($T_{BS}$), in which the amount of traffic ($T_{bs}$) is added such that this corresponds to a fraction of the assumed traffic distribution; and (c) determining whether or not more traffic ($T_{BS}$) can be added by comparing the limiting capacity representative value to at least the used capacity representative value; and wherein:
the capacity is a downlink capacity;
the traffic ($T_{BS}$) is downlink traffic ($T_{BS}$);
the limiting capacity representative value is a maximum allowed transmission power ($P_{BS,max}$); and
the used capacity representative value is a required transmission power $P_{traffic}$; and the method further comprises the steps of:
determining whether or not more downlink traffic ($T_{BS}$) can be added by comparing the maximum allowed transmission power ($P_{BS,max}$) to the sum of a fixed power ($P_{fixed}$) and the transmission power $P_{traffic}$; and (a2) defining the fixed power ($P_{fixed}$) to the at least one base station (BS1, BS2) in the at least one cell.

15. The method recited in claim 14 further comprising the step of:

(d) repeatedly adding an amount of traffic ($T_{BS}$) and determining whether or not more traffic ($T_{BS}$) can be added, as long as more traffic ($T_{BS}$) can be added.

16. The method recited in claim 14 wherein a fixed amount of traffic ($T_{BS}$) is added.

17. The method recited in claim 14 wherein the amount of traffic ($T_{BS}$) is chosen such that an increase in used capacity representative value is fixed.

18. The method recited in claim 14 wherein an inter-cell interference effect is included in the calculation of the used capacity representative value.

19. The method recited in claim 14 wherein a soft handover effect is included in the calculation of the used capacity representative value.

20. The method recited in claim 14 wherein the radio network is a CDMA network.

21. The method recited in claim 14 wherein the determination of whether or not more downlink traffic ($T_{BS}$) can be added uses the formula:

$$P_{fixed} + \Sigma P_{traffic} < P_{BS,max}$$

where: $\Sigma P_{traffic}$ is a sum of all transmission power $P_{traffic}$.

22. A system for planning and/or evaluation of a capacity in a radio network comprising at least one base station (BS1, BS2) defining at least one cell, the system comprising:
means for defining a limiting capacity representative value to the at least one base station (BS1, 2S2) in the at least one cell;
means for adding an amount of traffic ($T_{BS}$) to the at least one cell and calculating a used capacity representative value at the at least one base station (BS1, BS2) for the added amount of traffic ($T_{BS}$), in which the amount of traffic ($T_{bs}$) is added such that this corresponds to a fraction of the assumed traffic distribution; and
means for determining whether or not more traffic ($T_{BS}$) can be added by comparing the limiting capacity representative value to at least the used capacity representative value; and wherein:
the capacity is an uplink capacity;
the traffic ($T_{BS}$) is uplink traffic;
the limiting capacity representative value is an unloaded link budget (L); and
the used capacity representative value is a noise rise κ comprising an intra-cell interference effect from the added amount of uplink traffic ($T_{BS}$).

23. The system recited in claim 22 further comprising:
means for repeatedly adding the amount of traffic ($T_{BS}$) and determining whether or not more traffic ($T_{BS}$) can be added, as long as more traffic ($T_{BS}$) can be added.

24. The system recited in claim 22 wherein a fixed amount of traffic ($T_{BS}$) is added.

25. The system recited in claim 22 wherein the amount of traffic ($T_{BS}$) is chosen such that an increase in used capacity representative value is fixed.

26. The system recited in claim 22 wherein the radio network is a CDMA network.

27. The system recited in claim 22 further comprising one or more modules.

28. The system recited in claim 27 wherein one or more of the modules are provided to include an inter-cell interference effect in the calculation of the used capacity representative value.

29. The system recited in claim 27 wherein one or more the modules are provided to include a soft handover effect in the calculation of the used capacity representative value.

30. The system recited in claim 22 wherein one or more modules are provided to define the unloaded link budget (L) as a function of a distance to the at least one base station (BS1, BS2) in the at least one cell.

31. The system recited in claim 22 wherein one or more modules are provided to define the unloaded link budget (L) comprising a soft handover effect.

32. The system recited in claim 22 wherein one or more modules are provided to determine whether or not more uplink traffic ($T_{BS}$) can be added using the formula:

$$\Sigma \kappa < L_{min}$$

where: $\Sigma \kappa$ is a sum of all noise rises κ and $L_{min}$ is a minimum value of the unloaded link budget (L).

33. The system recited in claim 22 wherein one ore more modules are provided to determine whether or not more uplink traffic ($T_{BS}$) can be added using the formula:

$$\Sigma \kappa < L_{min} + x$$

where: $\Sigma \kappa$ is a sum of all noise rises κ, $L_{min}$ is a minimum value of the unloaded link budget (L) and x is a non-zero value.

34. A system for planning and/or evaluation of a capacity in a radio network comprising at least one base station (BS1, BS2) defining at least one cell, the system comprising:
means for defining a limiting capacity representative value to the at least one base station (BS1, BS2) in the at least one cell;
means for adding an amount of traffic ($T_{BS}$) to the at least one cell and calculating a used capacity representative value at the at least one base station (BS1, BS2) for the added amount of traffic ($T_{BS}$), in which the amount of traffic ($T_{bs}$) is added such that this corresponds to a fraction of the assumed traffic distribution; and
means for determining whether or not more traffic ($T_{BS}$) can be added by comparing the limiting capacity representative value to at least the used capacity representative value; and wherein:
the capacity is a downlink capacity;
the traffic ($T_{BS}$) is downlink traffic;
the limiting capacity representative value is a maximum allowed transmission power ($P_{BS,max}$);

the used capacity representative value is a required transmission power $P_{traffic}$; and the system further comprises:

means for determining whether or not more downlink traffic ($T_{BS}$) can be added by comparing the maximum allowed transmission power ($P_{BS,max}$) to the sum of a fixed power($P_{fixed}$) and the transmission power $P_{traffic}$; and means for defining the fixed power ($P_{fixed}$) to the at least one base station (BS1, BS2) in the at least one cell.

35. The system recited in claim 34 further comprising:
means for repeatedly adding the amount of traffic ($T_{BS}$) and determining whether or not more traffic ($T_{BS}$) can be added, as long as more traffic ($T_{BS}$) can be added.

36. The system recited in claim 34 wherein a fixed amount of traffic ($T_{BS}$) is added.

37. The system recited in claim 34 wherein the amount of traffic ($T_{BS}$) is chosen such that an increase in used capacity representative value is fixed.

38. The system recited in claim 34 wherein the radio network is a CDMA network.

39. The system recited in claim 34 further comprising one or more modules.

40. The system recited in claim 39 wherein one or more of the modules are provided to include an inter-cell interference effect in the calculation of the used capacity representative value.

41. The system recited in claim 39 wherein one or more the modules are provided to include a soft handover effect in the calculation of the used capacity representative value.

42. The system recited in claim 34 wherein one or more modules are provided to determine whether or not more downlink traffic ($T_{BS}$) can be added using the formula:

$$P_{fixed} + \Sigma P_{traffic} < P_{BS,max}$$

where: $\Sigma P_{traffic}$ is a sum of all transmission power $P_{traffic}$.

* * * * *